United States Patent
Rabagliano et al.

(10) Patent No.: US 6,722,227 B2
(45) Date of Patent: *Apr. 20, 2004

(54) HORN ACTUATING DEVICE FOR A STEERING WHEEL

(75) Inventors: Massimo Rabagliano, Monza (IT); Adolfo Ridolfi, Tregnago (IT); Roberto Ridolfi, Tregnago (IT); Luciano Verda, La Loggia (IT)

(73) Assignee: Key Safety Systems, Inc., Sterling Heights, MI (US)

( * ) Notice: Subject to any disclaimer, the term of this patent is extended or adjusted under 35 U.S.C. 154(b) by 34 days.

This patent is subject to a terminal disclaimer.

(21) Appl. No.: 10/125,504

(22) Filed: Apr. 19, 2002

(65) Prior Publication Data

US 2003/0024342 A1 Feb. 6, 2003

(30) Foreign Application Priority Data

Aug. 3, 2001 (IT) ...................................... TO2001A0784

(51) Int. Cl.[7] .............................. G05G 1/10; H01H 9/00
(52) U.S. Cl. ........................ 74/552; 280/731; 200/61.54
(58) Field of Search ................................ 74/552, 551.8; 280/728.3, 731; 200/61.54, 61.55

(56) References Cited

U.S. PATENT DOCUMENTS

| 4,434,338 | A | | 2/1984 | Rood | ........................ 200/276 |
|---|---|---|---|---|---|
| 5,338,906 | A | * | 8/1994 | Yokota | ..................... 200/61.54 |
| 6,082,758 | A | * | 7/2000 | Schenck | ..................... 280/731 |
| 6,139,051 | A | * | 10/2000 | Fujita | ......................... 280/731 |
| 6,257,615 | B1 | * | 7/2001 | Bohn et al. | .................. 280/731 |
| 6,312,012 | B1 | * | 11/2001 | Bohn et al. | .................. 280/731 |
| 6,457,379 | B1 | * | 10/2002 | Mirone | ........................ 74/552 |

FOREIGN PATENT DOCUMENTS

| EP | 0744329 A | 12/1995 |
|---|---|---|
| EP | 1099604 A | 9/2000 |

OTHER PUBLICATIONS

Italian Patent Application No. TO98A000795 (translation attached)/ Title: "Dispositivo di azionamento di avvisatore acustico per un volante di autoveicolo" / Filed on Jan. 16, 2002 / Total pages including cover 18 / Inventor: Mirone Paolo.

* cited by examiner

*Primary Examiner*—David A. Bucci
*Assistant Examiner*—Bradley J. Van Pelt
(74) *Attorney, Agent, or Firm*—Lonnie Drayer; Jarett Rieger

(57) ABSTRACT

A horn actuating device for a steering wheel has a plurality of helical springs that return an airbag module to a raised resting position. Each helical spring has a free upper end that moves with the airbag module that also acts as a mobile electrical contact cooperating with the fixed electrical contact to bring about actuation of the horn.

5 Claims, 3 Drawing Sheets

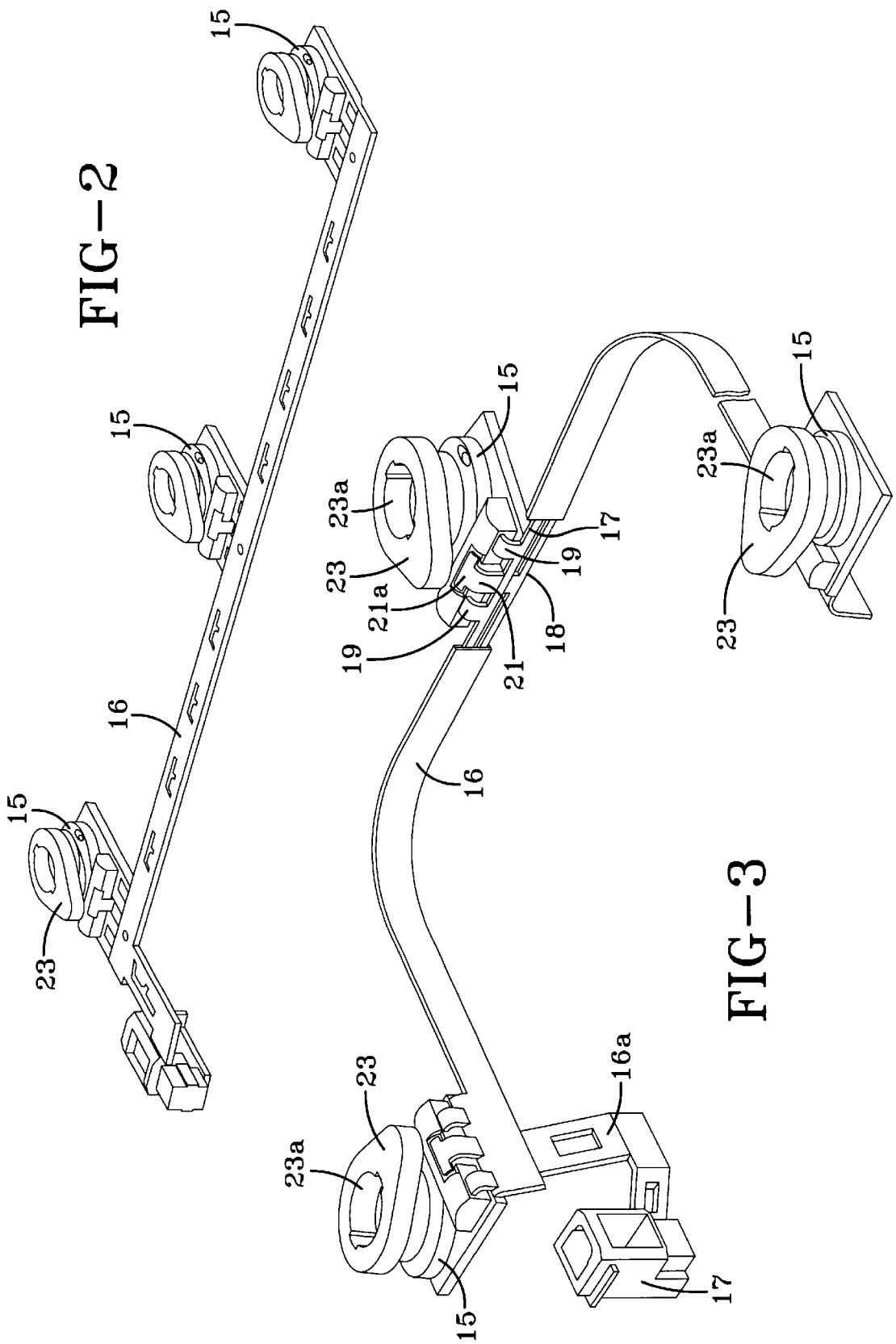

HORN ACTUATING DEVICE FOR A STEERING WHEEL

FIELD OF THE INVENTION

The present invention relates to an assembly of a motor vehicle steering wheel and an airbag module and to a horn actuating device mounted on a steering wheel.

DISCUSSION OF THE PRIOR ART

Italian patent application TO98A000795 teaches a motor vehicle steering wheel comprising: a metallic armature comprising a hub, a circular rim and a plurality of spokes joining the hub to the circular rim; an actuating element, typically comprising an airbag module, which is mounted on the armature of the steering wheel in movable manner between a raised resting position and a lowered horn actuating position; resilient means interposed between said actuating element and said steering wheel armature to return the actuating element to its raised position; a horn actuating device interposed between the actuating element and the steering wheel armature and comprising at least a first electrical contact rigidly connected to the steering wheel armature; and at least a second electrical contact which moves with the actuating element and is intended to cooperate with said first electrical contact for actuation of the horn. The resilient means comprise a plurality of springs, each of which exhibits a fixed base portion supported by the steering wheel armature and a portion operatively associated with the actuating element and having a free end suitable for constituting said second electrical contact which cooperates with said first electrical contact. The helical springs are mounted on respective plastic supports interconnected by a flexible plastic strip in which are embedded two conductive tracks, respectively connected electrically to each spring and to the first electrical contact cooperating therewith, in such a manner as to form a preassembled unit adapted to the steering wheel armature.

SUMMARY OF THE INVENTION

There is provided in accordance with the present invention a steering wheel comprising a metallic armature comprising a hub, a circular rim and a plurality of spokes joining the hub to the circular rim, an airbag module mounted on the armature of the steering wheel in a manner such that the airbag module is movable between a raised resting position and a lowered horn actuating position, a horn actuating device interposed between the airbag module and the steering wheel armature and comprising at least a first electrical contact rigidly connected to the steering wheel armature and at least a second electrical contact which moves with the airbag module and cooperates with said first electrical contact for actuation of the horn, a plurality of helical springs interposed between said airbag module and said steering wheel armature to return the airbag module to the raised resting position, each of said helical springs has a fixed base portion supported by the steering wheel armature and a portion operatively associated with the airbag module and has a free end comprising said second electrical contact which cooperates with said first electrical contact, and said helical springs are mounted on respective plastic supports interconnected by a flexible plastic strip in which are embedded two conductive tracks, respectively connected electrically to each helical spring and to the first electrical contact cooperating therewith to form a preassembled unit adapted to the steering wheel armature, said helical springs each having a said free end acting as the second electrical contact comprising an extended portion of the helical spring protruding outside the theoretical cylinder of the helical spring.

BRIEF DESCRIPTION OF THE DRAWINGS

FIG. 2 is a perspective view of the preassembled unit constituting the horn actuating device prior to mounting on the steering wheel.

FIG. 3 is a perspective view of the unit of FIG. 2 in the configuration it assumes on the motor vehicle steering wheel.

DETAILED DESCRIPTION OF THE INVENTION

Figure 1:
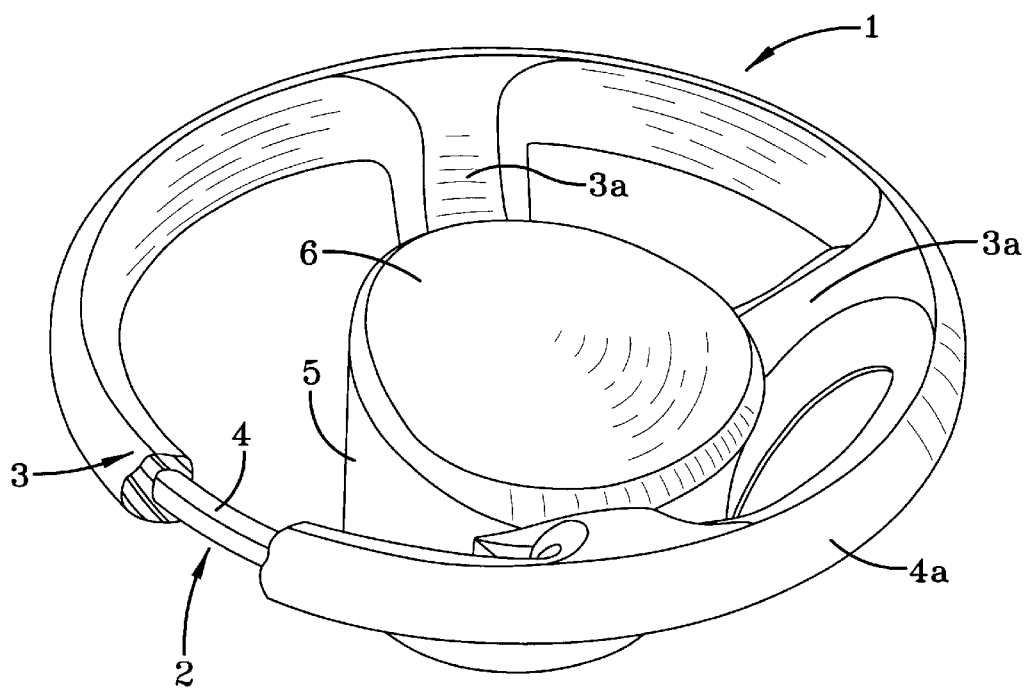
FIG. 1 is a perspective view of a preferred embodiment of a steering wheel according to the invention.

With reference to the drawings, a motor vehicle steering wheel 1 comprises a metallic armature 2 embedded in a known manner known in a suitable padding material 3, such as an elastomer. The metallic armature 2 comprises a circular rim 4 connected by metallic spokes 3, a portion of one of which is visible in FIGS. 4 and 5, to a hub 5 that is intended to be fixed to a motor vehicle's steering column. Likewise, the padding material 3 comprises a circumferential portion 4a which covers the circular rim 4 of the metallic armature, three spoke portions 3a which cover the corresponding spokes 3 of the metallic armature and a hub 5 connected to the spokes 3a and surmounted by an airbag cover 6 which is associated with an airbag module located in the hub of the metallic armature. The structure and shape of said airbag module is neither described nor illustrated here since it may be implemented in any known embodiment.

Figure 5:
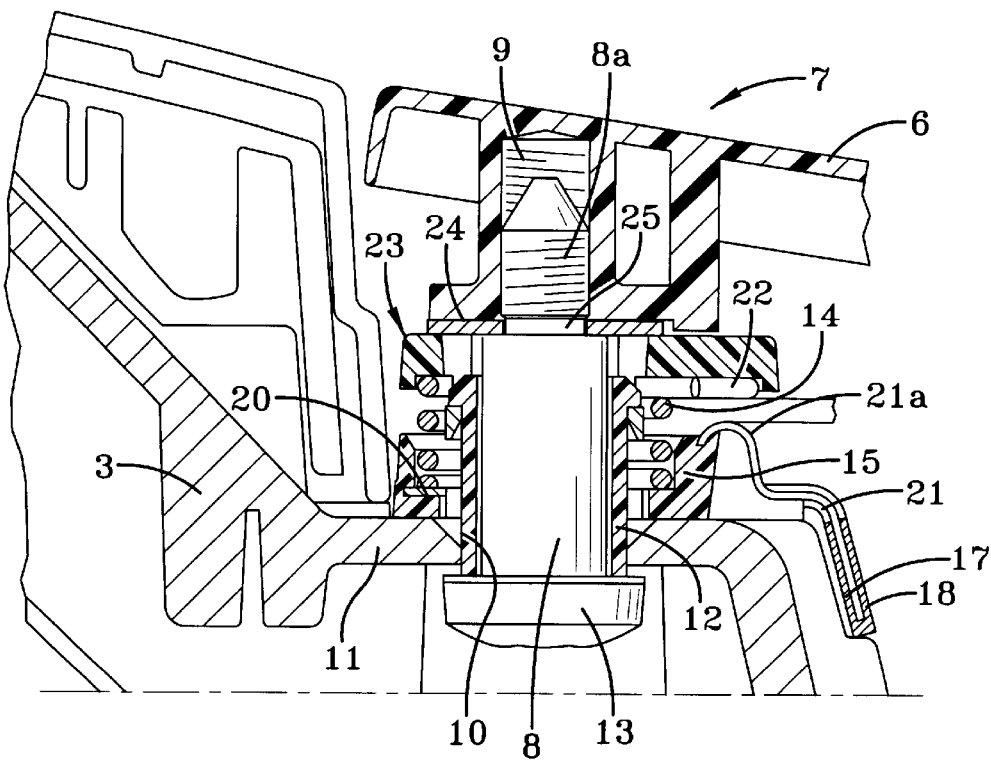

What is important for the purposes of understanding the invention is that the airbag cover 6 of the airbag module has projections 7, only one of which is shown in FIG. 5, on its internal surface for fixing the support and guide screws 8. Each projection 7 provides a blind threaded hole 9, into which is screwed a threaded end portion 8a of a screw 8. Said screw is inserted from below through a hole 10 located in an intermediate portion 11 of the respective metallic spoke 3. The intermediate portion 11 of the spoke is substantially flat at this location and extends radially with respect to the axis of rotation of the steering wheel. The screw 8 is slidingly mounted in the hole 10 in the metallic armature with an interposed plastic sleeve 12. At its lower end, the screw 8 has a head 13 that bears against a lower surface of the metallic armature in the region of the extreme upper extent of the airbag module. Said airbag module, with the airbag cover 6 which is a constituent part thereof, is returned towards said extreme upper position by a plurality of helical springs 14. It is understood that any suitable resilient means may be used in place of the helical springs. The lower end of each helical spring 14 rests on the spoke 11 with an interposed plastic component 15 that defines a seat for the spring. As shown in FIGS. 2 and 3, the plastic supports 15 are interconnected by a flexible plastic strip 16 in which are embedded two conductive tracks 17, 18. At each support 15, two branches 19 leave the track 17 and extend to form a metallic contact 20 which is embedded in the plastic support 15 and is in electrical contact with the lower end of the respective helical spring 14. Still at each support 15, a branch 21 leaves the track 18 this time, the end 21a of which branch defines a first electrical contact of the motor vehicle's horn actuating device.

II

Figure 6:
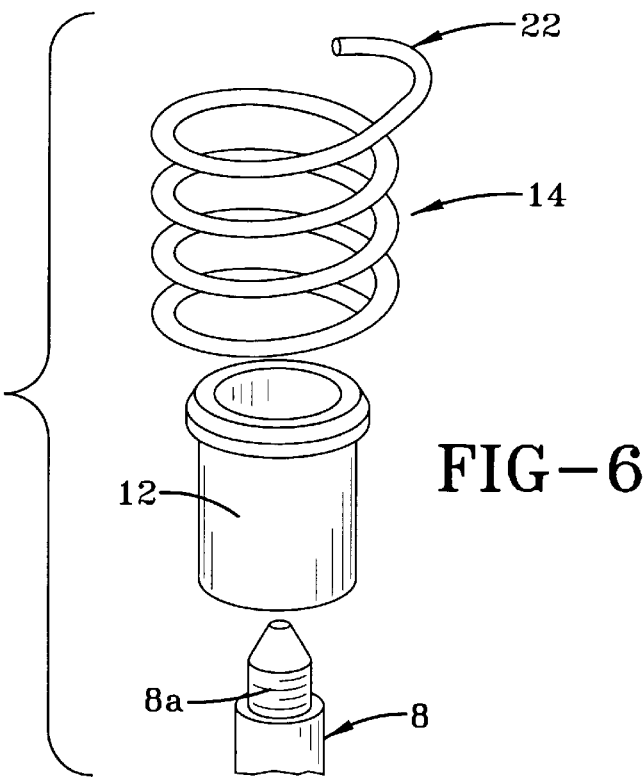
FIG. 6 is a perspective exploded view of a detail of FIG. 4.

As best seen in FIG. 6, the upper end of each spring 14 has an extended portion 22 that protrudes outside the theoretical cylinder of the helical spring. The extension 22 of the helical spring is V-shaped and is substantially contained in a plane perpendicular to the axis of the helical spring. Said extended portion 22 of the helical spring constitutes a second electrical contact intended to come into contact with the first electrical contact 21a to actuate the horn.

The upper end of the spring 14 is covered with a cap 23 comprising a plastic component having a central hole 23a therethrough to allow the screw 8 to pass through the cap and is shaped so as to cover the upper circular end of the helical spring and its extended portion 22.

With reference to FIGS. 2 and 3, the flexible strip 16 is extended into a portion 16a ending in a plastic body 17 of a connector for connecting the electrical tracks 17, 18 to the motor vehicle's on-board electric power supply.

Figure 4:
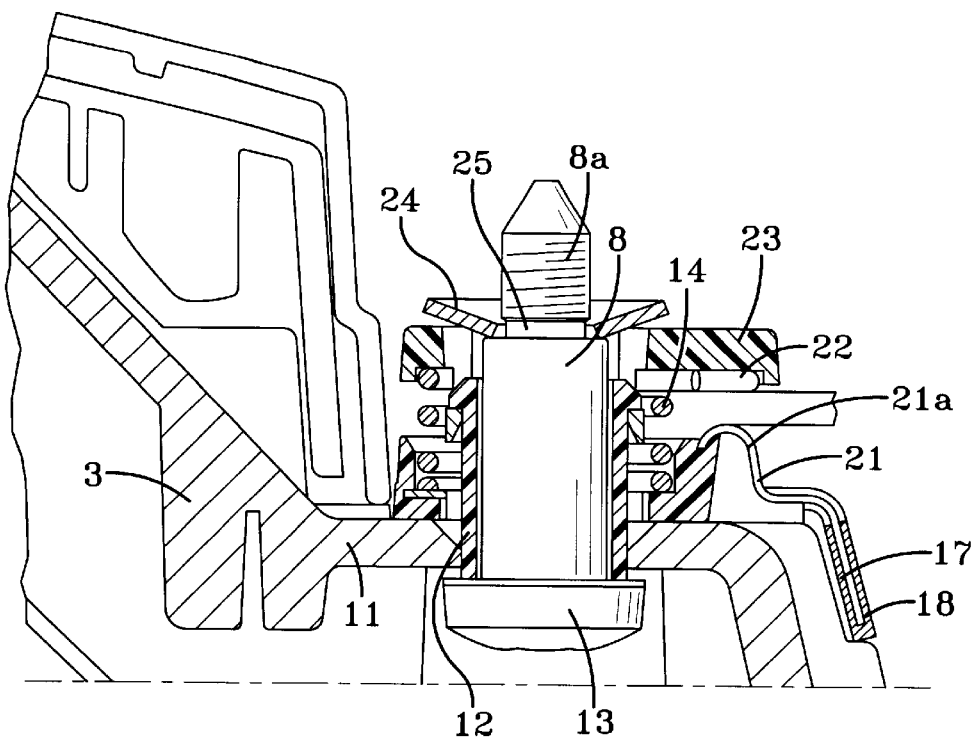
FIGS. 4 and 5 are enlarged scale cross-sectional views of one of the constituent springs of the unit according to the invention before and after mounting on a motor vehicle steering wheel.

FIGS. 4 and 5 illustrate the mounting of each screw 8. As shown in FIG. 4, before the airbag module is applied onto the upper end 8a of the screw 8, a conical metallic washer 24 is fitted around the screw and in the mounted state shown in FIG. 5, the washer is interposed between the plastic cap 23 and a wall of the projection 7. Once the screw 8 has been screwed into the hole 9 of the projection 7 of the airbag cover, the washer 24 is forced to adopt a flattened state with its internal annular edge bearing within a circumferential neck 25 of the body of the screw 8, so as to act as an anti-unscrewing device for the screw. Once mounted in this manner, each screw 8 is rigidly connected to the air bag module and thus acts as a support and guide element for said airbag module. The airbag module is returned towards its resting position by three helical springs 14. By exerting hand pressure on the airbag cover 6, the airbag module may be lowered as far as to bring the upper end 22 of at least one of the springs 14 into contact with the respective electrical contact 21a and so actuate the horn. The whole unit illustrated in FIGS. 2 and 3 may be preassembled and mounted in the steering wheel in a single operation, after which the airbag module may be mounted by screwing in the screws 8 through the passage in the metallic armature 11.

The specific shape of the resilient means, the helical springs 14, which return the airbag module towards its resting position ensures, on the one hand, simplicity of manufacture and, on the other, an effective return action of the airbag module towards the resting position. Finally, the above-described shape of the springs means that the springs themselves may be used as electrical contact means for actuating the horn.

Of course, while sticking to the principle of the invention, it is possible for constructive details and embodiments to differ widely from what has been described and illustrated above purely by way of example without as a result falling outside the scope of the present invention.

We claim:

1. A steering wheel comprising:

a metallic armature comprising a hub, a circular rim and a plurality of spokes joining the hub to the circular rim, an airbag module mounted on the armature of the steering wheel in a manner such that the airbag module is movable between a raised resting position and a lowered horn actuating position, said airbag module having an airbag cover, a horn actuating device interposed between the airbag module and the steering wheel armature and comprising at least a first electrical contact rigidly connected to the steering wheel armature and at least a second electrical contact which moves with the airbag module and cooperates with said first electrical contact for actuation of the horn, a plurality of helical springs interposed between said airbag module and said steering wheel armature to return the airbag module to the raised resting position, each of said helical springs has a fixed base portion supported by the steering wheel armature and a portion operatively associated with the airbag module and has a free end comprising said second electrical contact which cooperates with said first electrical contact, and said helical springs are mounted on respective plastic supports interconnected by a flexible plastic strip in which are embedded two conductive tracks, respectively connected electrically to each helical spring and to the first electrical contact cooperating therewith to form a preassembled unit adapted to the steering wheel armature, said free end of each of the helical springs comprising an extended portion of the helical spring protruding outside a theoretical cylinder of the helical spring.

2. The steering wheel according to claim 1, wherein said extended portion of each helical spring is V-shaped and extends perpendicular to the axis of the helical spring.

3. The steering wheel according to claim 2, wherein there is applied onto each helical spring a plastic end cap which also covers said extended portion of the helical spring which is an electrical contact.

4. The steering wheel according to claim 2, wherein screws are attached to said airbag module, each screw mounted from beneath through the steering wheel armature and through a respective helical spring, each screw having a head bearing against a lower surface of the steering wheel armature in the resting position of the airbag module.

5. The steering wheel according to claim 4, wherein between said airbag module and the upper end of each helical spring, there is interposed a washer having an internal annular edge located within a circumferential neck of the respective screw.

* * * * *